(12) United States Patent
Dabney et al.

(10) Patent No.: US 10,367,771 B2
(45) Date of Patent: Jul. 30, 2019

(54) IDENTIFYING COMMUNICATION PARTICIPANTS TO A RECIPIENT OF A MESSAGE

(71) Applicant: Dropbox, Inc., San Francisco, CA (US)

(72) Inventors: Todd Dabney, San Francisco, CA (US); Sean Beausoleil, Mountain View, CA (US)

(73) Assignee: Dropbox, Inc., San Francisco, CA (US)

( * ) Notice: Subject to any disclaimer, the term of this patent is extended or adjusted under 35 U.S.C. 154(b) by 47 days.

(21) Appl. No.: 14/504,349

(22) Filed: Oct. 1, 2014

(65) Prior Publication Data

US 2016/0099903 A1 Apr. 7, 2016

(51) Int. Cl.
*H04L 12/58* (2006.01)
*H04W 4/14* (2009.01)

(52) U.S. Cl.
CPC .............. *H04L 51/28* (2013.01); *H04W 4/14* (2013.01); *H04L 51/34* (2013.01)

(58) Field of Classification Search
CPC ......... H04L 51/04; H04L 51/28; H04L 51/16; H04L 51/22; H04L 51/24; H04L 51/32; H04L 12/5895; H04L 51/12; H04L 12/581; H04L 12/586; H04L 12/5865; H04L 12/587; H04L 12/588; H04L 12/589; H04L 12/5835; H04L 12/5885; H04L 51/066; H04L 51/34; H04L 51/36; H04L 61/1564; H04L 61/1594; H04L 61/30; H04L 61/3005; H04L 61/307; H04L 61/301; H04L 61/6013; H04L 61/303; H04L 61/3035; H04L 61/304; H04L 61/305; H04L 61/3055; H04L 51/00; H04L 51/14; H04W 4/14; H04W 4/18; H04W 4/20; H04W 4/12; H04W 4/00; H04W 88/02; H04W 8/26; G06Q 10/107; G06Q 10/10; G06Q 10/109; G06F 17/276; G06F 3/0482; G06F 17/30386; G06F 17/30554; G06F 17/278; G06F 3/04842; H04M 1/274558; H04M 1/72552

See application file for complete search history.

(56) References Cited

U.S. PATENT DOCUMENTS

| | | |
|---|---|---|
| 6,952,805 B1 | 10/2005 | Tafoya et al. |
| 7,444,351 B1 | 10/2008 | Nomiyama |
| 7,543,243 B2 | 6/2009 | Schwartz |

(Continued)

OTHER PUBLICATIONS

Minkov, Einat, et al., "Contextual Search and Name Disambiguation in Email Using Graphs," SIGIR '06, Aug. 6-11, 2006, Seattle, WA, 8 pages.

(Continued)

*Primary Examiner* — Greg C Bengzon
(74) *Attorney, Agent, or Firm* — DLA Piper LLP US

(57) ABSTRACT

Participant identifiers, or display names, for participants in an electronic communication can be selected such that each participant's display name is unique relative within a defined set of "relevant" participants, such as all participants in an electronic communication exchange or all contacts in a contacts list maintained for a specific user. Selection of display names can be optimized to provide a unique display name for each participant using a reduced or minimized number of characters.

20 Claims, 10 Drawing Sheets

(56) References Cited

U.S. PATENT DOCUMENTS

| | | | |
|---|---|---|---|
| 7,685,237 B1* | 3/2010 | Weaver | G06Q 10/10 709/205 |
| 7,747,690 B2 | 6/2010 | Kraenzel et al. | |
| 7,853,656 B2 | 12/2010 | Yach | |
| 8,006,190 B2 | 8/2011 | Quoc | |
| 8,150,922 B2* | 4/2012 | Griffin | H04L 12/1827 709/206 |
| 8,621,022 B2* | 12/2013 | Buchheit | G06Q 10/10 709/206 |
| 8,676,913 B1* | 3/2014 | Roche | H04L 51/32 709/206 |
| 8,701,014 B1* | 4/2014 | Schlegel | H04L 51/22 715/741 |
| 8,762,464 B2 | 6/2014 | Van Belle | |
| 9,063,989 B2 | 6/2015 | Buchheit | |
| 9,313,160 B1* | 4/2016 | Shamis | H04L 51/16 |
| 2003/0177190 A1* | 9/2003 | Moody | G06Q 10/107 709/206 |
| 2004/0054737 A1* | 3/2004 | Daniell | G06Q 10/107 709/206 |
| 2004/0199581 A1* | 10/2004 | Kucharewski | G06Q 10/10 709/204 |
| 2004/0215726 A1 | 10/2004 | Arning | |
| 2005/0108342 A1* | 5/2005 | Sasaki | G06Q 10/10 709/206 |
| 2005/0222985 A1* | 10/2005 | Buchheit | G06Q 10/107 |
| 2006/0053195 A1* | 3/2006 | Schneider | H04L 12/1827 709/204 |
| 2006/0053196 A1* | 3/2006 | Spataro | G06Q 10/107 709/205 |
| 2006/0053380 A1* | 3/2006 | Spataro | G06F 16/93 715/753 |
| 2006/0242109 A1 | 10/2006 | Pereira et al. | |
| 2008/0168026 A1* | 7/2008 | Patil | G06Q 10/107 |
| 2008/0182568 A1* | 7/2008 | Kim | H04M 1/2745 455/418 |
| 2009/0013043 A1* | 1/2009 | Tan | G06Q 10/107 709/205 |
| 2009/0106383 A1* | 4/2009 | Liang | H04L 51/28 709/206 |
| 2010/0030715 A1* | 2/2010 | Eustice | G06Q 10/10 706/12 |
| 2010/0069095 A1* | 3/2010 | Yahav | H04L 51/066 455/466 |
| 2010/0205179 A1* | 8/2010 | Carson | G06Q 10/10 707/740 |
| 2011/0106889 A1 | 5/2011 | Scott | |
| 2011/0126126 A1* | 5/2011 | Blair | G06Q 10/107 715/752 |
| 2011/0244882 A1* | 10/2011 | Hancock | H04W 4/02 455/456.1 |
| 2011/0265012 A1 | 10/2011 | Koopman | |
| 2012/0134480 A1* | 5/2012 | Leeds | H04M 1/57 379/88.12 |
| 2012/0254317 A1* | 10/2012 | Bayles | H04L 51/28 709/206 |
| 2012/0317499 A1* | 12/2012 | Shen | H04L 51/04 715/752 |
| 2013/0060867 A1* | 3/2013 | Davis | H04L 67/30 709/206 |
| 2013/0060868 A1* | 3/2013 | Davis | G06Q 10/107 709/206 |
| 2013/0060869 A1* | 3/2013 | Davis | G06Q 10/107 709/206 |
| 2013/0191759 A1* | 7/2013 | Bhogal | G06Q 10/10 715/752 |
| 2013/0218896 A1* | 8/2013 | Palay | H04L 51/16 707/741 |
| 2014/0096033 A1* | 4/2014 | Blair | G06F 3/01 715/752 |
| 2014/0136636 A1* | 5/2014 | Fabre | H04L 51/34 709/206 |
| 2014/0181934 A1* | 6/2014 | Mayblum | H04L 63/10 726/7 |
| 2015/0017962 A1* | 1/2015 | Howard | H04W 8/22 455/418 |
| 2015/0032828 A1* | 1/2015 | Ordogh | H04L 51/00 709/206 |
| 2015/0200878 A1* | 7/2015 | Shih | H04L 51/046 709/206 |
| 2015/0201062 A1* | 7/2015 | Shih | H04M 1/72552 455/564 |
| 2015/0295872 A1* | 10/2015 | Hawryluk | G06F 21/6245 715/752 |
| 2016/0366221 A1* | 12/2016 | Palmeri | H04L 63/0807 |
| 2019/0075071 A1* | 3/2019 | Kucharewski | H04L 51/36 |

OTHER PUBLICATIONS

Diehl, Christopher, et al., "Name Reference Resolution in Organizational Email Archives," Society for Industrial and Applied Mathematics, 2006, [online], <URL: http://www.siam.org/meetings/sdm06/proceedings/007diehlc.pdf,>, 12 pages.

Carvalho, Vitor, R., et al., "Ranking Users for Intelligent Message Addressing," 30th European Conference on IR Research, ECIR 2008, Glasgow, UK, Mar. 30-Apr. 3, 2008, [online], <URL: http://link.springer.com/chapter/10.1007/978-3-540-78646-7_30>, 12 pages.

* cited by examiner

| 302 Given Name | 304 Surname | 306 Nickname | 308 Email address | 310 City | 312 Company |
|---|---|---|---|---|---|
| | | Client User: Joy Rawls <joy@here.com> ~301 | | | |
| Antonio | Davinci | Tony | adavinci@here.com | San Francisco | MyCo |
| John | Doe | JD | jdoe@here.com | San Francisco | MyCo |
| John | Locke | | locke@companya.com | Las Vegas | CompanyA |
| John | Marx | | jmarx@here.com | San Francisco | MyCo |
| John | Paine | | jpaine@here.com | San Francisco | MyCo |
| Karen | Andre | | kandre@here.com | San Francisco | MyCo |
| Sarah | Stallworth | | sarah99@isp2.com | Berkeley | |
| Sarah | Swann | | sarahs@isp1.com | Berkeley | |

FIG. 3

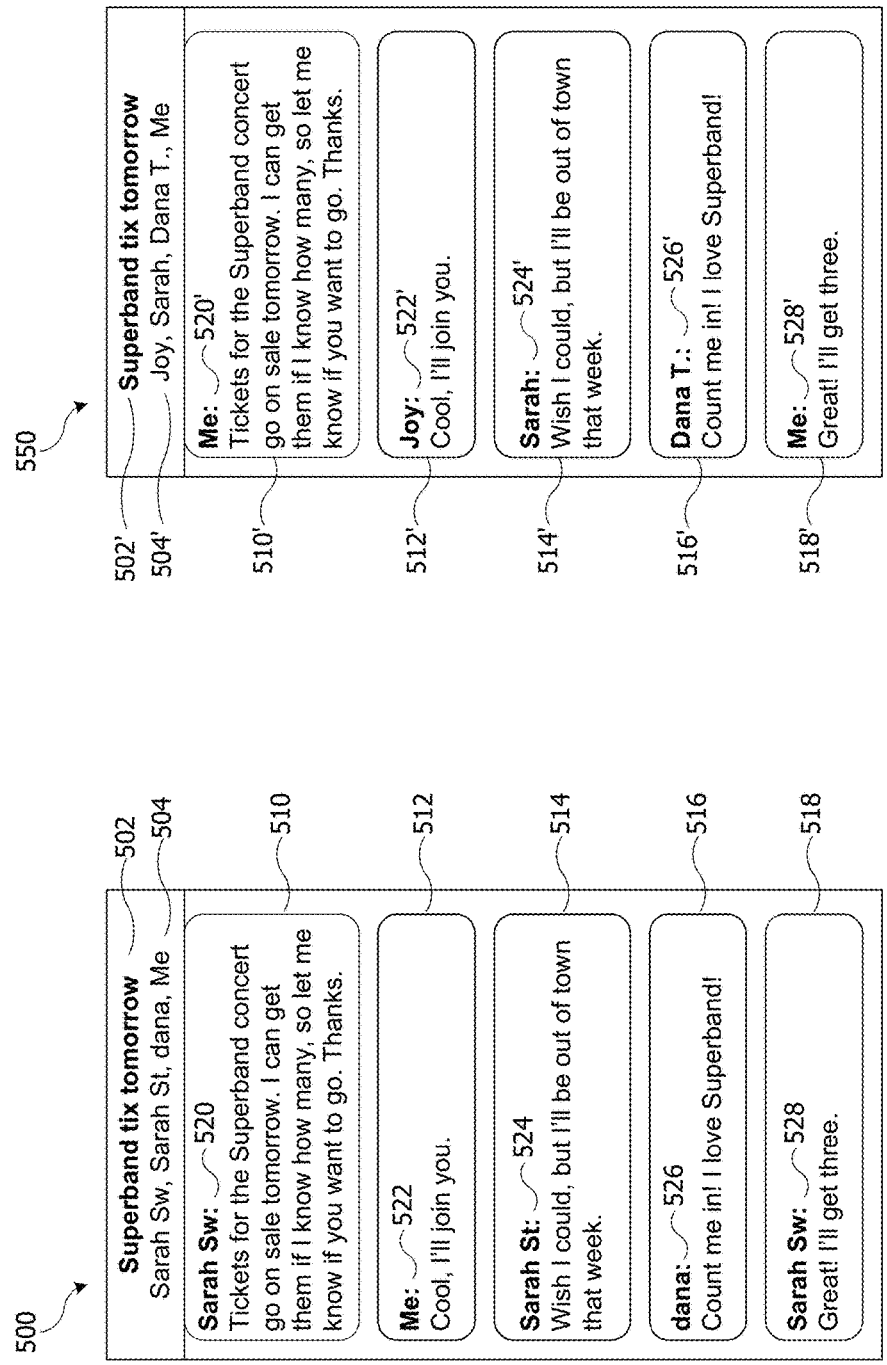

600

Date: August 25, 2014
604 — To: joy@here.com,sarah99@isp2.com,dana@domain.com
602 — From: sarahs@isp1.com
Subject: Superband tix tomorrow
Body: Tickets for the Superband concert go on sale tomorrow. I can get them if I know how many, so let me know if you want to go. Thanks.

Date: August 25, 2014
604 — To: joy@here.com,sarah99@isp2.com,dana@domain.com
652  602 — From: sarahs@isp1.com
Subject: Superband tix tomorrow
SenderDisplayName: Sarah Sw
RecipientDisplayName: Sarah St, dana
654
Body: Tickets for the Superband concert go on sale tomorrow. I can get them if I know how many, so let me know if you want to go. Thanks.

*FIG. 6B*

| Rule | Example 1: jdoe@here.com | Example 2: kmarx@here.com | Example 3: sarahs@isp1.com | Example 4: karen@domain.com |
|---|---|---|---|---|
| Sender's nickname or given name  921 | JD | Karen | Sarah | karen |
| Sender's given name; add characters of surname as needed  922 | John D | Karen | Sarah Sw | karen@d |
| Sender's nickname or given name; add characters of surname as needed  923 | JD | Karen | Sarah Sw | karen@d |
| Sender's surname; add characters of given name as needed  924 | Doe | K. Marx | Swann | <null> |
| Sender's given-name initial plus surname; add characters of given name as needed  925 | J. Doe | K. Marx | S. Swann | <null> |
| Sender's nickname or given name plus portion of domain name as needed  926 | JD | Karen | Sarah (isp1) | karen (domain) |
| Sender's nickname or given name plus company name  927 | JD (MyCo) | Karen (MyCo) | Sarah () | karen (?) |
| Sender's nickname or given name plus city name  928 | JD (San Francisco) | Karen (San Francisco) | Sarah (Berkeley) | karen (?) |

FIG. 9

IDENTIFYING COMMUNICATION PARTICIPANTS TO A RECIPIENT OF A MESSAGE

BACKGROUND

The present disclosure relates generally to electronic communications and in particular to identifying communication participants to a recipient of an electronic message.

Individuals are becoming increasingly reliant on electronic messaging services, such as email services, instant messaging services, SMS/MMS (also referred to as text-messaging) services, and so on. Such services allow users to send and receive messages. In some instances, the services may also provide additional features related to managing messages, such as the ability to store or archive messages in folders, delete messages, search stored messages, and so on.

Many users who rely on electronic messaging services use various electronic devices, such as laptop or desktop computers, smart phones, tablets, and so on, that are capable of connecting to various data networks and acting as clients of an electronic messaging service. For example, a client can receive messages from a messaging service and can provide a user interface that allows the user to interact with messages, e.g., by replying to messages, deleting messages, archiving messages, composing new messages to be sent, etc. When connected to a data network, the client device can communicate updates from the messaging service to the user and can communicate instructions to the messaging service to implement user actions. The convenience and speed of electronic messaging can lead to a large volume of messages being sent and received.

Unfortunately, many users of messaging services now find themselves overwhelmed by the volume of messages they receive. Techniques that allow users to better manage their messages are therefore desirable.

SUMMARY

Certain embodiments of the present invention relate to providing identifiers (also referred to as "display names") for participants in an electronic communication to a particular recipient of one or more communications (also referred to as a "client user"). In some embodiments, a display name for a participant can be selected such that each participant's display name is unique relative within a defined set of "relevant" participants. The set of relevant participants can be defined, for example, as all participants in an electronic communication exchange (e.g., an email message thread, text message conversation, chat room, or the like). As another example, the set of relevant participants can be defined as corresponding to the contacts in a contacts list maintained for the client user. Selection of display names can be optimized to provide a unique display name for each participant using a reduced or minimized number of characters.

For example, in some embodiments, the participant's given name is used as the display name if the given name is unique within the set of relevant participants. If the given name is not unique, the display name can be augmented with additional information, such as the participant's surname or a portion thereof, a domain name associated with the participant, or other information about the participant (such as a city or employer name) that is not shared with any other participant in the set of relevant participants. In some embodiments, a set of possible unique display names for a given participant can be generated according to various rules, and the display name that includes the smallest number of characters (or satisfies some other criterion for being preferred) can be selected. Where multiple client users receive the same message, the display names can be customized for each client user, so that different client users can each see different display names for the same participant(s).

Certain aspects of the invention relate to methods for generating a display name for a sender of a message (or another participant in communication). A server (or other computer system) can receive a message to be delivered to a recipient. Based at least in part on a sender identifier in the message, the server can determine a default display name (e.g., a given name, nickname, username, or the like) for the sender. The server can also determine whether the default display name uniquely identifies a sender within a set of relevant participants. If so, the server can use the default display name, e.g., to populate a sender display name field of the message. Otherwise, the server can generate an alternative display name that does uniquely identify the sender (e.g., by adding one or more characters of the sender's surname or domain name to the default display name) and can use the alternative display name in place of the default display name.

An alternative display name can be generated using any information item about the sender that is available to the server, e.g., via a contacts list or the like. Examples include the sender's name (or portions thereof), a domain name for the sender, a company name associated with the sender, a geographical location (e.g., city, state, country) associated with the sender, and so on. In some embodiments, a number of different disambiguation rules can be applied to generate candidate display names, and the alternative display name can be selected from among the candidate display names, e.g., based on which candidate display name is the shortest unique name (i.e., unique within the set of relevant participants).

The following detailed description together with the accompanying drawings will provide a better understanding of the nature and advantages of the present invention.

BRIEF DESCRIPTION OF THE DRAWINGS

FIG. 3 shows a contacts list for a client user that can be used in generating display names according to an embodiment of the present invention.

FIGS. 5A and 5B show examples of a conversation view screen as seen by two different participants according to an embodiment of the present invention.

FIGS. 6A and 6B show an example of inbound message processing according to an embodiment of the present invention. FIG. 6A shows an inbound email message prior to processing, and FIG. 6B shows the inbound email message after processing.

FIG. 9 shows examples of disambiguation rules that can be used according to various embodiments of the present invention.

DETAILED DESCRIPTION

Certain embodiments of the present invention relate to providing identifiers (also referred to as "display names") for participants in an electronic communication to a particular recipient of one or more communications (also referred to as a "client user"). In some embodiments, a display name for a participant can be selected such that each participant's display name is unique relative within a defined set of "relevant" participants. The set of relevant participants can be defined, for example, as all participants in an electronic communication exchange (e.g., an email message thread, text message conversation, chat room, or the like). As another example, the set of relevant participants can be defined as corresponding to all contacts in a contacts list maintained for the client user. Selection of display names can be optimized to provide a unique display name for each participant using a reduced or minimized number of characters.

For example, in some embodiments, the participant's given name is used as the display name if the given name is unique within the set of relevant participants. If the given name is not unique, the display name can be augmented with additional information, such as the participant's surname or a portion thereof, a domain name associated with the participant, or other information about the participant (such as a city or employer name) that is not shared with any other participant in the set of relevant participants. In some embodiments, a set of possible unique display names for a given participant can be generated according to various rules, and the display name that includes the smallest number of characters (or satisfies some other criterion for being preferred) can be selected. Where multiple client users receive the same message, the display names can be customized for each client user, so that different client users can each see different display names for the same participant(s).

Figure 1:
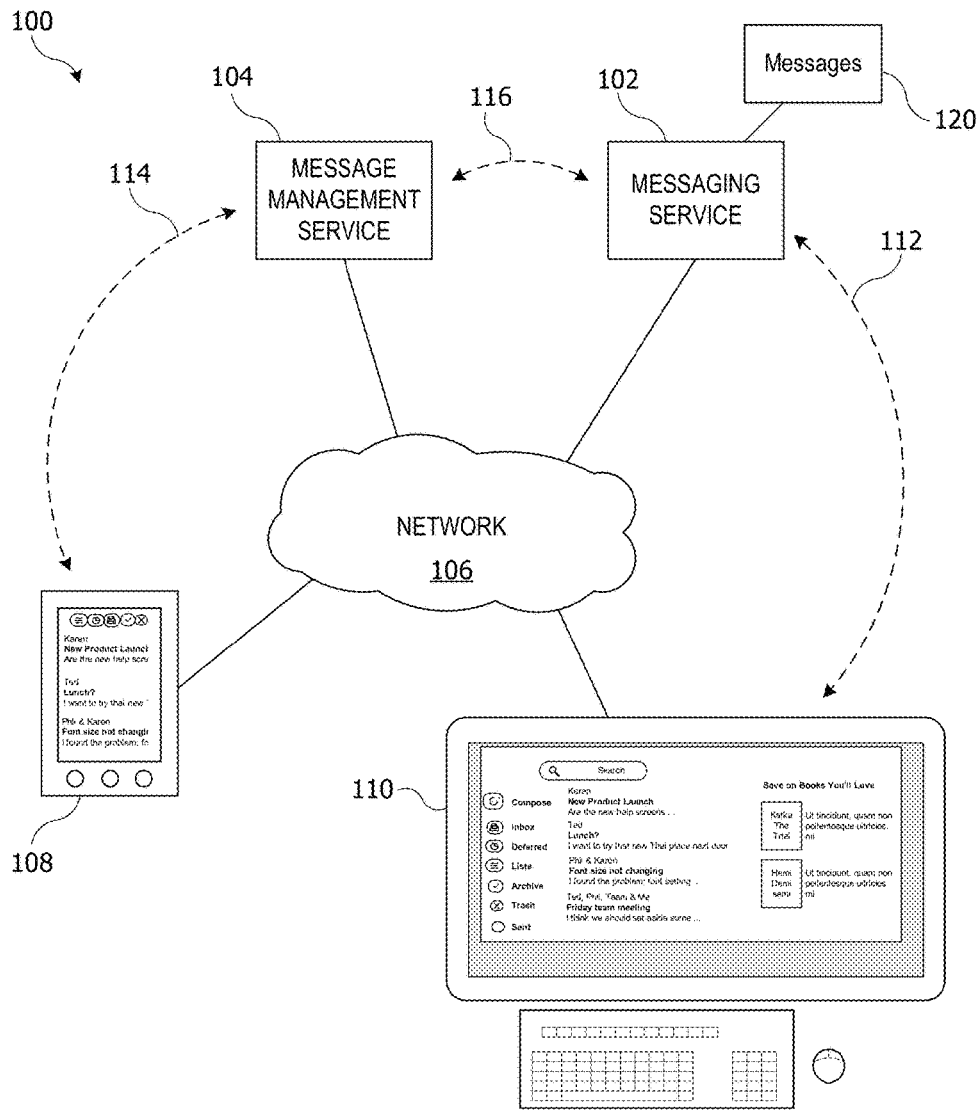
FIG. 1 shows a block diagram of a communication system according to an embodiment of the present invention.

FIG. 1 shows a block diagram of a communication system 100 according to an embodiment of the present invention. Communication system 100 can include a messaging service 102 and a message management service 104 connected to a network 106. Also connected to network 106 can be various clients 108, 110 that can be used to access messaging service 102 either directly (as indicated by dashed arrow 112) or indirectly via message management service 104 (as indicated by dashed arrows 114, 116). It is to be understood that access to message management service 104 and/or messaging service 102 can occur via network 106.

Messaging service 102 can be any service that allows users to send, receive, store, and/or access messages, where a "message" can include any electronic communication generated by a sender and directed to one or more recipients, such as email messages, instant messages (e.g., messages sent between users using various "chat" services), SMS/MMS messages (e.g., messages conforming to Short Messaging Service and/or Multimedia Messaging Service protocols supported by various cellular and other wireless data networks), voice messages, photo/image messages, social network messages, and so on. Examples of messaging service 102 can include email services such as Gmail™ (a service of Google Inc.) and Yahoo!® Mail (a service of Yahoo! Inc.). Other examples can include instant messaging or chat services such as Gmail's chat feature or the Facebook® chat function (a service of Facebook, Inc.), SMS/MMS services provided by cellular data carriers, social network services with a messaging component (e.g., social networks provided by Facebook, Inc., or LinkedIn Corp.), and so on. In some embodiments, a user can establish an account with messaging service 102, and messaging service 102 can store and provide access to the user's messages 120. Messaging service 102 can also provide web-based client interfaces, dedicated application programs, application program interfaces (APIs), and/or other tools for facilitating user access to messages 120 using clients 108, 110.

Message management service 104 can be a service that acts as a proxy or intermediary between messaging service 102 and clients 108, 110, as indicated by dashed arrow 116. Message management service 104 can provide enhanced functionality for organizing, storing, accessing, composing, and/or responding to messages 120 stored by messaging service 102. One example of message management service 104 can be the Mailbox service of Dropbox, Inc.

Clients 108 and 110 can be user-operated computing devices that can execute software that allows a user (also referred to herein as a "client user") to interact with message management service 104 and/or messaging service 102. Various types of computing devices can be used, including desktop computers, laptop computers, tablet computers, smart phones, wearable computing devices, personal digital assistants, and so on. By way of example, client 108 can be a smart phone that can execute an application program (also referred to as an app) to communicate with message management service 104 via network 106. The app can be provided by a provider of message management service 104 and can be customized to allow access to enhanced message management functions supported by message management service 104.

Client 110 can be a desktop computer that can execute an app to communicate with message management service 104. This app can be, for example, a mail client app built into an operating system of a desktop computer, a web browser that interfaces with a web server provided by message management service 104, a service-specific application provided by the provider of message management service 104, or another app. It is to be understood that in some embodiments, clients 108 and 110 can execute other apps to communicate with messaging service 102 without using message management service 104.

A given client user can have accounts with both messaging service 102 and message management service 104. The client user's account with message management service 104 can be linked to the client user's account with messaging service 102, allowing the client user to use message management service 104 to manage messages 120 sent and received via messaging service 102. In some embodiments, a client user can have multiple accounts with one or more messaging services 102 and can link any or all of these accounts to a single account with message management service 104. Message management service 104 can retrieve a subset of messages for the client user from messaging service 102 and deliver these messages to client 108 and/or client 110.

As shown in FIG. 1, a client user can view and interact with messages using either client 108 or client 110. At various times, the same client user can use both client 108 and client 110. For example, client 108 can be a mobile device that the client user can easily carry (e.g., in a pocket or bag) while going about daily activities, providing convenient, on-the-go access to messages. However, client 108, being designed for portability, may have a limited screen size, limiting the amount of information that can be visible at once. Client 110 can be a desktop or laptop computer system that has a larger screen size capable of presenting more information at once, but the larger screen size may make client 110 less portable and/or less convenient for an on-the-go user to remove from a stowed location and use to access messages. Given such tradeoffs, it is expected that client users may want to use different clients at different times to interact with the same messaging service 102 and/or message management service 104.

In accordance with certain embodiments of the present invention, client 108 and client 110 can present messages or message lists to the client user. The messages and/or message lists can be part of a communication exchange, where a "communication exchange" refers to a sequence or group of related messages exchanged between or among two or more participants.

As used herein, a "participant" can be any entity (e.g., person, organization, or automated communication agent) that participates in a communication exchange as either a sender of one or more messages, a recipient of one or more messages, or both. In embodiments described herein, one of the participants in a communication exchange is the client user (who receives at least one message in the exchange and can send zero or more messages in the exchange), and there can be one or more other participants, each of which can participate in the exchange as a sender or recipient or both. One example of a communication exchange is an email message thread, in which a first sender composes and sends a first email message to one or more recipients. The sender and the recipient(s) are participants in the exchange, and the participants may reply to the first email message and/or to reply messages in the thread, and so on. Another example of a communication exchange can be a sequence of text messages (e.g., messages sent using existing SMS and/or MMS services). A sender can address a text message to one recipient or a group of two or more recipients, and the recipient(s) can respond, with messages being sent to the group in the case where the sender addressed the message to a group. During the course of a communication exchange, it is possible for participants to be added or dropped. For instance, a person replying to an email may add additional recipients or choose to reply to fewer than all of the recipients of the email being replied to.

Client 108 and/or client 110 can present the communication exchange, or individual messages from the exchange, to the client user, who is assumed to be one of the participants in the exchange. It can be helpful to the client user for client 108 and/or client 110 to present identifiers of the other participants in the communication exchange. However, the space available for listing participants may be limited, particularly on a device such as client 108, which has a relatively small screen size. Accordingly, it may be desirable to identify the participants in a space-efficient manner while still providing useful information to the user. Embodiments described below provide adaptive techniques for generating participant identifiers (also referred to as "display names") that can help the client user to recognizing the other participants (e.g., by being unique within a set of relevant participants as described below) and at the same time compact (e.g., by using a reduced number of characters where possible) to make efficient use of available space on the display.

It will be appreciated that system 100 is illustrative and that variations and modifications are possible. Embodiments of the present invention can support any number of client devices, including client devices belonging to or otherwise associated with different users. Further, in some embodiments, a message management service can interact with multiple messaging services and can manage messages of disparate types (e.g., email and social network messages). In embodiments where the message management service interacts with multiple messaging services, the message management service can generate display names for inbound messages to the client with or without regard to which messaging service was the source of a particular inbound message.

Figure 2:
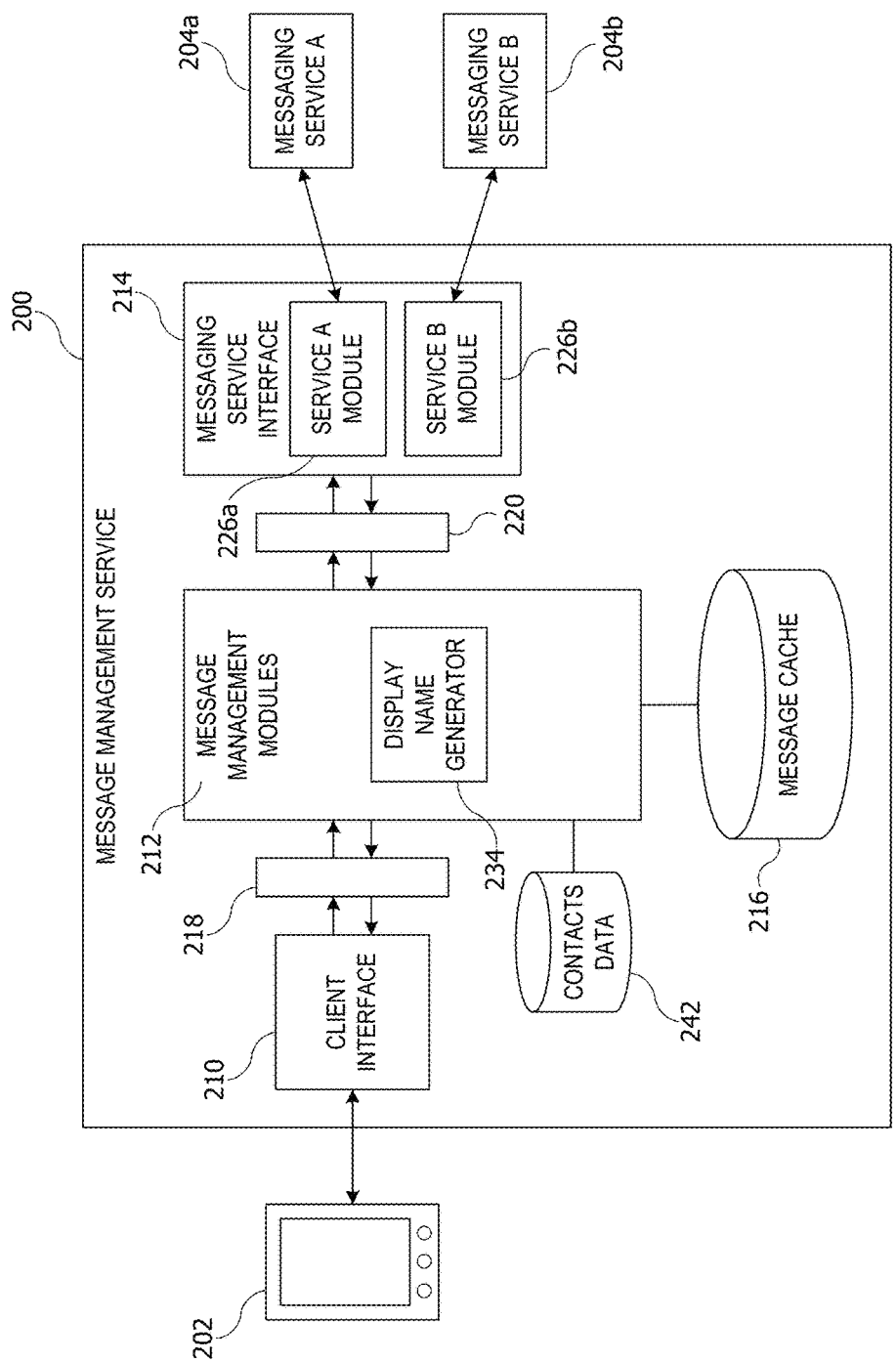
FIG. 2 shows a block diagram of a message management service according to an embodiment of the present invention.

FIG. 2 shows a block diagram of a message management service 200 according to an embodiment of the present invention. Message management service 200 can implement message management service 104 of FIG. 1. For example, message management service 200 can act as an intermediary between a client 202 (e.g., implementing client 108 or client 110 of FIG. 1) and various messaging services 204a, 204b (e.g., implementing messaging service 102) of FIG. 1. Each service 204a, 204b can be a different messaging service, such as different email services, an email service and a social network service, and so on. While two messaging services 204 are shown, any number of messaging services 204 can be supported by a single message management service 200.

Message management service 200 can include a client interface 210, message management modules 212, a messaging service interface 214, and a message cache 216. A client transfer layer 218 can provide transfer queues for transferring messages and other instructions and information between client interface 202 and message management modules 212, and a service transfer layer 220 can provide transfer queues for transferring messages and other instructions and information between message management modules 212 and messaging service interface 214.

Client interface 210 can communicate with multiple instances of client 202 (e.g., clients associated with different users and/or multiple clients associated with the same user). For instance, client interface 210 can deliver "inbound" messages from messaging services 204a, 204b to client 202, receive "outbound" messages from client 202, and/or receive various message processing instructions from client 202, such as instructions to defer a message, move a message to a list or folder, mark a message as read (or unread), delete a message, and so on. Such instructions can include event information or user actions.

Message management modules 212 can include functional blocks or modules configured to perform various operations on messages received by message management service 200, including outbound messages received from client 202 as well as inbound messages received from messaging services 204a, 204b. For example, message management modules 212 can include display name generator 234.

Display name generator 234 can process each inbound message received from messaging services 204a, 204b to determine a display name for the sender of the inbound message (and optionally other participants in a communication exchange of which the inbound message is a part, such as other recipients of the message) to be presented to the recipient. For example, display name generator 234 can analyze a sender identifier included in the inbound message and generate a display name for the sender that is unique relative to other recipients of the inbound message or relative to a larger set of relevant participants (e.g., the client user's contacts list). In some embodiments, display name generator 234 can analyze a list of participants included in the inbound message (or in the communication exchange of which the inbound message is a part) and generate a display name for each participant that is unique relative to other participants (or relative to a larger set of relevant participants such as the client user's contacts list). For example, depending on the set of relevant participants, the display name for a participant can include just the participant's given name, a previously established nickname for the participant, the participant's given name plus an initial letter of the participant's surname, an initial letter of the participant's given name plus the participant's surname, etc. Specific examples of operation of display name generator 234 and display names that can be generated are described below.

In some embodiments, message management service 200 can maintain a user contacts data store 242 to store a contacts list for each client user. The contacts list for a client user can be based on contacts information expressly provided by the client user (e.g., through synchronization with a contacts list maintained by the client user on client device 202), and/or on contacts information for the client user retrieved by message management service 200 from messaging services 204a, 204b. In some embodiments, the contacts list can also be populated or augmented based on analysis of messages sent to and/or sent by the client user; for instance, an entry in a contacts list can be automatically created for any address to which the client user sends a minimum number of messages or from which the client user receives a minimum number of messages. As described below, a contacts list for a client user that is stored in user contacts data store 242 can be used by display name generator 234 to define a set of relevant participants and/or to provide information usable to generate display names.

Messaging service interface 214 can include various service modules 226a, 226b, each of which can be configured to communicate with a different one of messaging services 204a, 204b. For example, different messaging services 204 may support different communication protocols for access by external clients (e.g., IMAP, POP, MAPI/Exchange, custom APIs, and so on), and each service module 226 can be configured to use the appropriate protocol for a particular messaging service 204.

In some embodiments, messaging service interface 214 can present itself to messaging services 204a, 204b as a client accessing functionality of messaging services 204a, 204b, so that the existence of message management service 200 can be transparent to messaging services 204a, 204b. For example, if messaging service 204a supports IMAP, service module 226a can establish a persistent IMAP connection to a user's account with messaging service 204a, allowing messaging service 204a to deliver any incoming messages or message updates it receives for the user's account to message management service 200. Similarly, message management service 200 can deliver any outbound messages or message updates it receives from client device 200 to messaging service 204a. Persistent connections to services other than IMAP can also be maintained, or messaging service interface 214 can periodically poll various messaging services 204 to obtain new messages. The persistent connection can be maintained regardless of whether a given user currently has any client 202 connected to client interface 210, and message management service 200 can maintain synchronization with messaging services 204. A particular client 202 can disconnect from message management service 200 at any time and can be resynchronized with message management service 200 whenever it reconnects to message management service 200.

Message cache 216 can be a database or other data store managed by message management service 200 that provides storage and retrieval of messages. For example, messages can be stored and retrieved by reference to internal message identifiers assigned to each message by message management service 200 and/or messaging services 204. Message management service 200 can use message cache 216 to store copies of messages that are likely to be of interest to a client, such as recently received messages or messages found in a user-initiated search.

Messaging services 204 can maintain their own message stores or repositories independently of any action by message management service 200. In some embodiments, messaging service 204 can maintain a primary (or "master") store of messages for a user that can include all messages currently associated with that user's account (e.g., including sent messages, received messages, archived messages, etc.), and message cache 216 can store a subset of the user's messages (also referred to as a "window" of messages) as well as partial information about additional messages in the primary store that are not currently replicated in message cache 216. If client 202 requests a message that is not presently stored in message cache 216, message management service 200 can retrieve the message from the appropriate messaging service 204 and deliver it to client 202.

In operation, message management service 200 can obtain inbound messages from messaging services 204 and provide the messages to client 202. Message management service 200 can also receive outbound messages (e.g., messages to be sent) from client 202 and provide the messages to messaging service 204 for delivery to the recipient(s). Message management service 200 can also receive message update requests (including action requests and event information as described herein) from client 202 and can provide corresponding instructions to messaging service 204, e.g., to mark messages as read or unread, move a message to a folder, apply or remove a message tag, delete a message, and so on. Message management modules 212 can perform various operations on inbound and/or outbound messages, examples of which are described below.

It will be appreciated that message management service 200 is illustrative and that variations and modifications are possible. For example, other message management modules and/or operations can be provided, such as the ability to defer messages for later review and/or response, tag messages, search messages, and so on. In some embodiments, message management can include windowing (selecting and immediately delivering to a client a fixed number of messages deemed likely to be relevant, such as the 50 or 100 or some other number of most recent messages), backfilling (populating message cache 216 with messages in anticipation of client requests), message format conversion (e.g., converting between a message format used by a messaging service and a format optimized for display on a client), management of message folders or streams, message sorting, management of attachments, synchronization with messaging services 204 (e.g., relaying instructions from client 202 to move or modify messages) and so on.

As noted above, users may communicate with a large number of people and may receive many messages. It can be helpful for the user to quickly recognize the sender of a received message and/or other participants in a communication exchange of which a received message is part. Some messaging clients address this need by extracting participant-identifying information (e.g., names, email addresses) from the message and displaying this information in a message list or message preview. This information, however, may take up considerable space. To conserve space, some messaging clients reduce the information, e.g., by truncating to a first name. However, a user may know multiple people with the same first name, so a first name might not be a reliable identifier.

Embodiments of the present invention provide adaptive generation of display names for participants in a communication exchange. In some embodiments, the adaptively-generated display name can allow a client user to readily recognize the participant while using a small number of characters where possible. Techniques for adaptive generation of display names can be implemented in a message management service (e.g., message management service 200 of FIG. 2 or message management service 104 of FIG. 1), in a messaging service (e.g., messaging service 204a, 204b of FIG. 2 or messaging service 102 of FIG. 1), or in a client device (e.g., client device 202 of FIG. 2 or client devices 108, 110 of FIG. 1).

For purposes of illustrating adaptive generation of display names, FIG. 3 shows a contacts list 300 for a client user that can be used in generating display names according to an embodiment of the present invention. Contacts list 300 can be stored, e.g., in contacts data store 242 of FIG. 2, in association with an identifier 301 of the client user to whom contacts list 300 belongs. In this example, each contact record (represented as rows 320) can include a given name (column 302) and a surname, or family name (column 304). Some contact records may include a nickname (column 306); in this example, some contact records do not include a nickname. Each contact record can have an electronic communication address (column 308); an email address is shown, but other addresses can be provided depending on the communication media supported, such a phone number (e.g., for SMS/MMS messages), a social media account identifier, or the like. Additional information may also be available, such as a city where the contact is located (column 310) and/or a company (column 312) for which the contact works. It is to be understood that a client user may have a larger number of contacts than that shown (e.g., dozens or hundreds of contacts), and that more or less information may be available for any given contact than is shown. For purposes of examples given below, it should be noted that contacts list 300 includes four contacts with the given name "John" and two contacts with the given name "Sarah."

Figure 4:
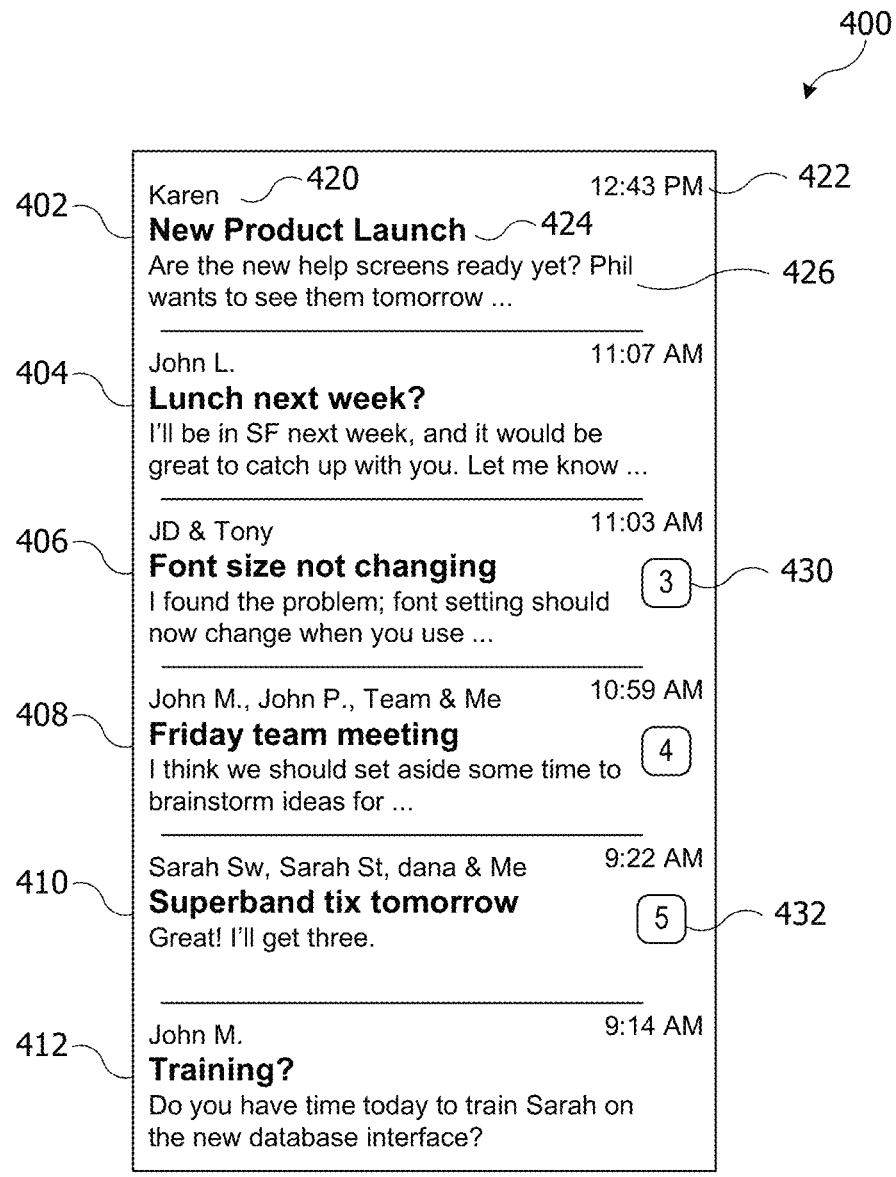
FIG. 4 shows a message list that can be presented on a client device according to an embodiment of the present invention.

FIG. 4 shows a message list 400 that can be presented on a client device of a user (e.g., client device 108 or 110 of FIG. 1, or client device 202 of FIG. 2) according to an embodiment of the present invention. For purposes of illustration, it is assumed that message list 400 is presented to a client user having contacts list 300 of FIG. 3. Message list 400 can include condensed representations of various messages 402, 404, 406, 408, 410, 412 received for the client user. As indicated for message 402, each message can include a participant identifier line 420 that includes display names for sender(s) associated with the message. In some embodiments, line 420 can also include display names for recipient(s) associated with the message. Each message can also include other information, such as timestamp 422, subject line 424, and content preview section 426, which can include a portion of the message content. As shown for messages 406 and 410, the message representation can also include a numbered badge 430, 432 indicating that messages 406 and 410 are each included in a communication exchange involving multiple messages (three messages in the case of message 406, five messages in the case of message 510). In various embodiments, different combinations of information can be shown.

In message list 400, the display names for each message have been generated using adaptive generation techniques according to an embodiment of the present invention, such that each named participant is uniquely identified relative to contacts list 300. For example, only one contact in contacts list 300 has the given name "Karen." Accordingly, the participant identifier for message 402 can be "Karen." However, four contacts in contacts list 300 have the given name "John." Accordingly, the participant identifier for message 404 can be "John L.," which distinguishes John Locke from the other three Johns in contacts list 300.

In the case of message 406, the participants have nicknames "JD" and "Tony" in contacts list 300, and these nicknames can be used as the participant identifiers.

In the case of message 408, the participants include two different Johns, distinguished by last initial, a defined group ("Team"), and the client user, who can be identified uniquely by the first-person pronoun "Me."

In the case of message 410, the participants include two people with given name "Sarah" and surname initial "S." To distinguish these participants, a second letter of the surname has been used, and "Sarah Sw." and "Sarah St." each uniquely identify one person in contacts list 300. The name "Dana" does not appear in contacts list 300 and is treated as a unique identifier.

A similar principle can be applied when presenting messages to the client user. For instance, selecting message 410 from message list 400 can result in presenting a "conversation" view of the communication exchange represented by message 410. FIG. 5A shows a first example of a conversation view screen 500 according to an embodiment of the present invention. In conversation view screen 500, the subject 502 (e.g., email subject line) appears at the top, with a list of participants 504 below. The display names in list 504 can be generated using adaptive generation techniques described below and can be the same as that shown for message in message list 400.

Screen 502 also includes a "conversation element" 510, 512, 514, 516, 518 corresponding to each message in the communication exchange. Each conversation element 510, 512, 514, 516, 518 corresponds to a different message in the exchange and includes a sender identifier 520, 522, 524, 526, 528 for that message, as well as the contribution of that message to the conversation. The "contribution" can be defined as including new substantive content added by the message but excluding content redundant with other messages. For instance, in some email services, a reply message can include a repeat of the text of the message being replied to, and such repeated content can be excluded from the contribution in the conversation view. In addition, signature blocks and other content deemed non-substantive can be excluded, allowing the user to see more of the substance of the conversation.

In screen 500, the sender identifier 520, 522, 524, 526, 528 for each conversation element 510, 512, 514, 516, 518 has been generated using adaptive reduction and corresponds to participant list 504. Thus, the two Sarahs are distinguished as "Sarah Sw." (sender 520, 528 of messages 510, 518) and "Sarah St." (sender 524 of message 514).

A message can be send to multiple client users of message management service 200. Where this is the case, message management service 200 can generate display names separately for each client user. By way of example, FIG. 5B shows a second example of a conversation view screen 550 according to an embodiment of the present invention. Conversation view screen 550 represents the same conversation as conversation view screen 500 of FIG. 5A, but the display corresponds to what might be seen by client user Sarah Swann. Accordingly, subject line 502' is the same as subject line 502, and the content of messages 510', 512', 514', 516', 518' is the same as messages 510, 512, 514, 516, 518, but participant list 504' and some of sender identifiers 520', 522', 524', 526', 528' are different, as they have been adapted for a different client user. For example, the identifier "Me" now refers to Sarah Swann and is used as sender identifier 520', 528' for messages 510', 518' sent by Sarah Swann. Likewise, sender identifier 522' is "Joy," referring to the user who was identified as "Me" in FIG. 5A. (In English, "Me" is a first-person pronoun, and users will not find this confusing.) In this example, it is assumed that Sarah Stallworth is the only "Sarah" in Sarah Swann's contacts list. Accordingly, sender identifier 514' can just be "Sarah," as the given name suffices to identify Sarah Stallworth to client user Sarah Swann. It is also assumed that Sarah Swann has multiple contacts with given name Dana, so the last initial is added in sender identifier 526'. As FIGS. 5A and 5B show, the display names provided for a particular client user can depend on the client user's context.

It is not expected that a sender's messaging service would be able to generate display names customized for a particular client user, particularly where the client user uses a different messaging service to receive messages. Accordingly, client-specific customization of display names can be performed by message management service 200 when processing inbound messages for a particular client user. For instance, FIG. 6A shows a format for an inbound email message 600 that can be processed by message management service 200. Message 600 can include a sender identifier 602, a list of recipients 604, and other information (e.g., date, subject, message body) as desired. Message 600 can be received by message management service 200 as an inbound message for a client user with email address "joy@here.com," who has contacts list 300 of FIG. 3.

Display name generator 234 can extract sender identifier 602 and/or recipient list 604 from message 600 and process them to generate display names. For example, as shown in FIG. 6A, sender identifier 602 and recipient list 604 each include email addresses. Display name generator 234 can retrieve contacts list 300 for the client user from contacts data store 242 and use the email addresses to identify corresponding contact records. Based on the contact records, display name generator 234 can determine display names to be used for each email address. Examples of algorithms for determining display names given a contact record are described below. Where the email address does not match a contact (e.g., the address "dana@domain.com" in line 604 does not match a contact in contacts list 300), display name generator 234 can implement a default behavior, such as using the username portion of the email address as the display name.

Display name generator 234 can add display name information to email message 600. FIG. 6B shows an example of a processed email message 600' according to an embodiment of the present invention. Processed email message 600' can be the same as inbound email message 600, with the addition of a "sender display name" field 652 that provides a display name corresponding to each email address in sender identifier field 602 and a "recipient display name" field 654 that provides a display name corresponding to each email address in recipient list 604. In this example, the client user (joy@here.com) does not have a display name listed; the message management service client app can automatically identify the client user as "Me." In some embodiments, the message management service client app displays names only for participants who have sent messages, and display names for all non-senders of a message (e.g., recipient display name field 654) need not be generated.

In some embodiments, the display name can be selected to provide an identifier that is unique within a set of relevant participants defined for the client user. For example, the display name for a sender can include the sender's given name and as much of the sender's surname as is needed to distinguish from all other senders in the defined set of relevant participants. The set of relevant participants can be defined as desired. For example, as described above, message management service 200 of FIG. 2 can store a contacts list for each client user and can treat the client user's contacts list as the set of relevant participants for that client user. As another example, the set of relevant participants can be defined as all participants (senders and/or recipients) in a specific communication exchange (e.g., an email message thread) of which the message is a part.

Figure 7:
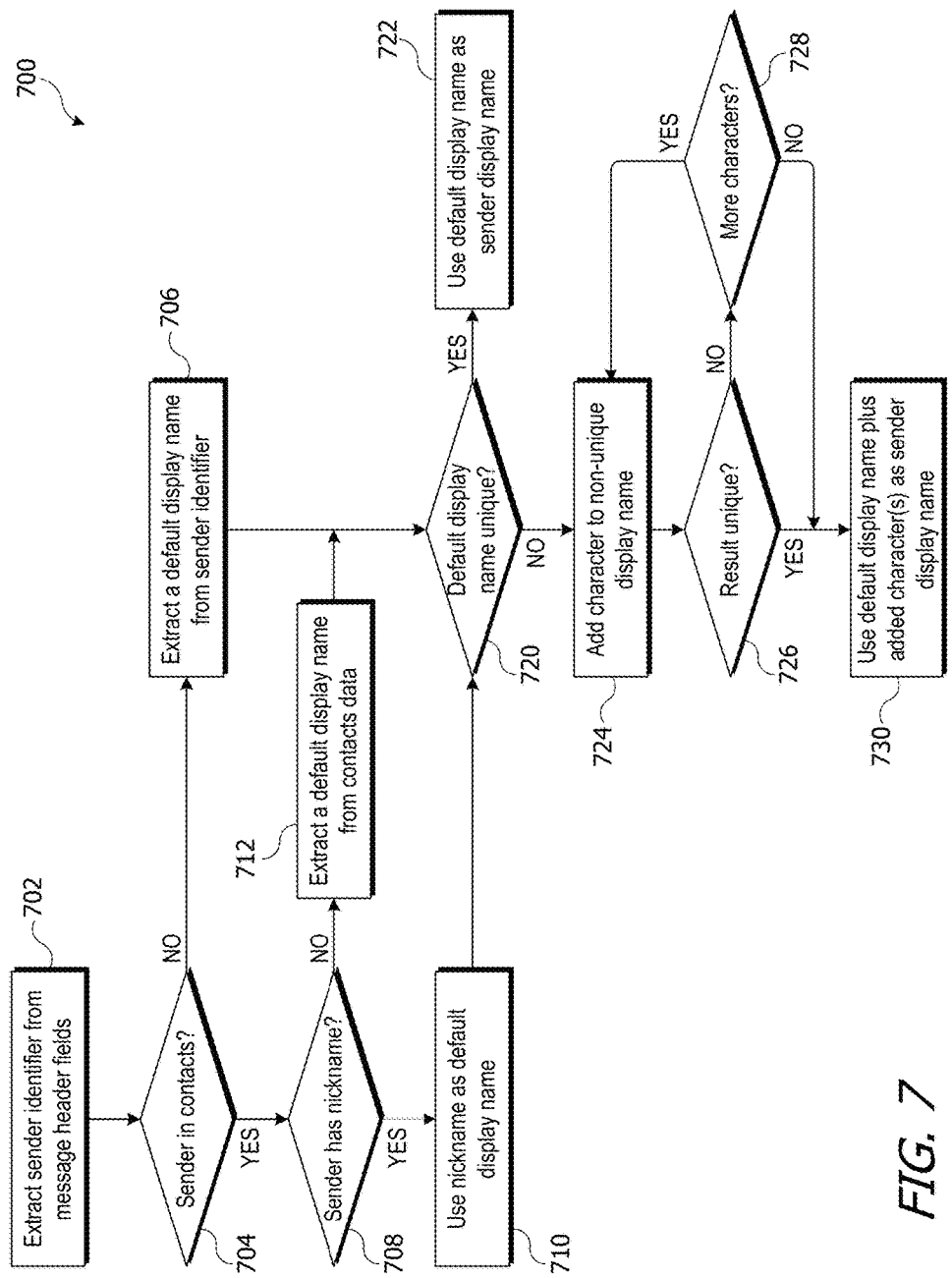
FIG. 7 shows a flow diagram of a process for generating a display name for a communication participant according to an embodiment of the present invention.

FIG. 7 shows a flow diagram of a process 700 for generating a display name for a message sender (or other participant in a communication exchange) according to an embodiment of the present invention. Process 700 can be implemented, e.g., in display name generator 234 of FIG. 2.

Process 700 can begin when an inbound message (e.g., message 600 of FIG. 6A) is received for delivery to a client user. At block 702, process 700 can extract a sender identifier from the message header fields of the inbound message. For example, "From" field 602 of message 600 can be parsed to extract the sender identifier "sarahs@isp1.com."

At block 704, process 700 can determine whether the sender identifier is in a contacts list maintained for the client user. For instance, process 700 can attempt to match the extracted sender identifier to one of records 320 in contacts list 300 of FIG. 3.

If the sender is not in the client user's contacts list, then at block 706, process 700 can extract a default display name for the sender from the sender identifier in the inbound message. In some instances, the sender's message server may have included a sender name along with the email address (e.g., From field 602 of FIG. 6A may identify the sender as "Sarah Swann <sarahs@isp1.com>"). In that case, process 700 can parse the sender name to identify a given name. Various parsing rules can be used. For instance, if a single name is provided, that name can be treated as the given name. If multiple names are provided, an assumption can be made as to whether the given name is more likely first or last (e.g., given name first would be likely for US-based domains but perhaps not for China-based or Japan-based domains).

In other instances, the sender identifier might not include a name (e.g., as shown in FIG. 6A). In this case, a default display name can be extracted from the sender address. For instance, in the case of email, the username portion of the sender's email address can be treated as a given name. It is to be understood that the username might or might not correspond to the sender's given name, but in either case, it may serve as a unique identifier of the sender.

If, at block 704, the sender is in the client user's contacts list, then at block 708, process 700 can determine whether the client user has associated a nickname with the sender. For instance, if the sender appears in contacts list 300, process 700 can extract a nickname (if one is present) from nickname field 306. If a nickname is associated with the sender, then at block 710, the nickname can be used as the default display name. If not, then at block 712, process 700 can extract the sender's given name from the contact record for the sender (e.g., from given name field 302) and use the given name as the default display name. In some embodiments, if the contact record for the sender does not provide either a given name or a nickname, then process 700 can use a surname if there is one or proceed to block 706 and extract a given name from the sender identifier.

Thus, at any of blocks 706, 710, or 712, process 700 can establish a default display name for the sender. Once a default display name has been established, process 700 can proceed to block 720. At block 720, process 700 can determine whether the default display name is unique within a defined set of relevant participants. For example, the set of relevant participants can be defined as all senders in the client user's contacts list, and process 700 can compare the default display name to a correspondingly-generated display name (e.g., given name or nickname) of each sender in the contacts list. If there are no matches, then the default display name can be considered unique. If there is one match, the default display name can be considered unique if the one match corresponds to the sender of the message (e.g., if the email address in the matching contact record matches the sender's email address) and not unique if the one match does not correspond to the sender of the message. If there are two or more matches, then the default display name is not unique. If the default display name is determined to be unique at block 720, then at block 722, the default display name can be used as the sender display name, and process 700 can end.

If, at block 720, the default display name is determined to be not unique, then process 700 can proceed to add additional characters in an attempt to disambiguate the sender display name. For example, at block 724, process 700 can select a character to append to the default display name (e.g., given name). In some embodiments where the default display name is a given name or nickname, if the sender has a known surname (e.g., from contacts list 300 or inferred from the sender identifier in the message), then the first character of the surname can be appended (with a space inserted between for readability if desired). If the sender does not have a known surname, a character from the domain name portion of the email address can be appended (with the "@" character inserted between if desired). At block 726, process 700 can determine whether the resulting display name is unique, similarly to block 720. If not, then at block 728, process 700 can determine whether more characters are available to be added. In some embodiments, up to all of the characters in the user's surname (or the domain name portion of the user's email address) can be added. In some embodiments, there may be a numerical upper limit on the number of added characters, in order to save space. If more characters are available, process 700 can return to block 724 to add the next character. Thus, characters can be added sequentially until either a unique result is obtained at block 726 or no more characters are available at block 728. At that point, at block 730, the default display name plus the added character(s) can be used as the sender display name (e.g., populating sender display name field 652 as shown in FIG. 6B), and process 700 can end.

To further illustrate process 700, assume that the client user's contacts list is represented by contacts list 300 of FIG. 3 and that contacts list 300 defines the set of relevant participants. Assume further that message 600 of FIG. 6A is received as an inbound message to the client user. At block 702, the sender of message 600 would be identified as "sarahs@isp1.com." At block 704, it can be determined that the email address sarahs@isp1.com matches a record in contacts list 300. At block 708, the sender has no nickname in contacts list 300, so the default display name "Sarah" would be extracted from contacts list 300 at block 712. At block 720, it can be determined that default display name "Sarah" is not unique, as two records match that given name. Accordingly, at block 724, the first character of the sender's surname can be added (in this case, "S"). At block 726, it can be determined that the result "Sarah S" is still not unique, as two records in contacts list 300 have names matching that pattern. At block 728, there are more characters in the sender's surname, so the next character (in this case, "w") would be added. At block 726, it can be determined that the result "Sarah Sw" is unique within the set of relevant participants, and the sender display name "Sarah Sw" can be entered in sender display name field 652 as shown in FIG. 6B.

Similarly, referring to FIG. 300, applying process 700 to a message from "adavinci@here.com" would result in sender display name "Tony" because this sender has a nickname that is unique. Applying process 700 to a message from "jmarx@here.com" would result in sender display name "John M"; the sender's given name is not unique, but the last initial suffices to distinguish from the other senders named John. Applying process 700 to a message from "kmarx@here.com" would result in sender display name "Karen" because the sender's given name is unique.

Further, as noted above, a client user can receive messages from senders not in the client user's contacts list. For example, if a user having contacts list 300 receives a message from a sender "karen@domain.com" (with no other information provided), applying process 700 can result in a sender display name "karen@d". The given name "karen" would be extracted at block 706. However, "karen" matches the given name of a record in contacts list 300, so another character would be added. If the same user receives a message from a sender "dana@domain.com" (again with no other information provided), applying process 700 can result in a sender display name "dana" because the given name "dana" does not match the given name of any record in contacts list 300.

It will be appreciated that process 700 is illustrative and that variations and modifications are possible. Steps described as sequential may be executed in parallel, order of steps may be varied, and steps may be modified, combined, added or omitted. For instance, where the sender's given name and surname are available, it is not required to start with the sender's given name; in some embodiments, the process may start with the sender's surname and add characters from the given name to disambiguate. In some embodiments, the process can start with the shorter of the sender's given name and surname and can add characters from the other name as needed.

Figure 8:
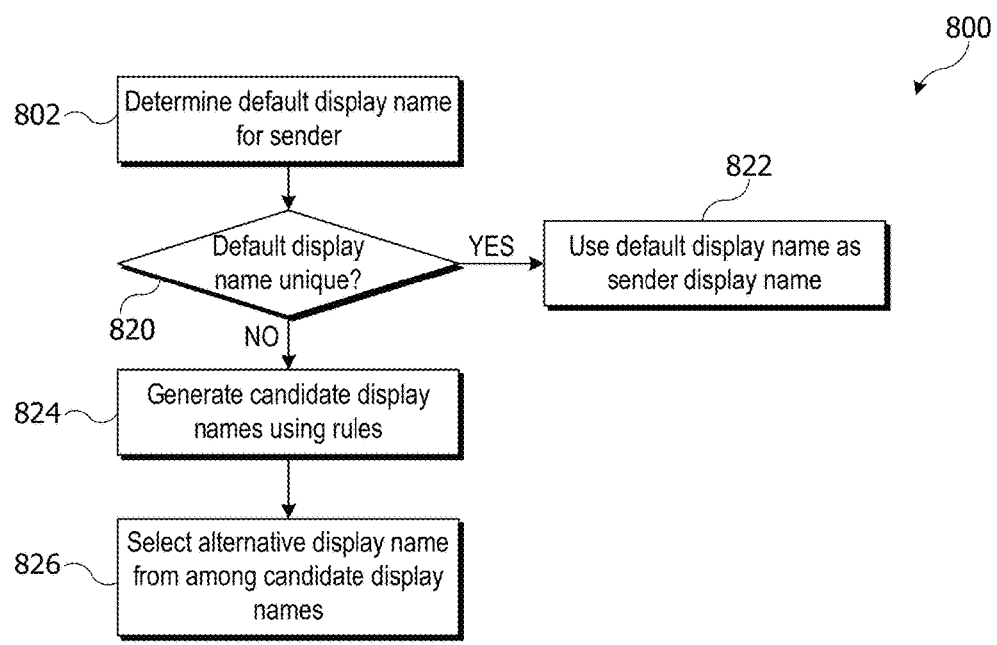
FIG. 8 shows a flow diagram of another process for generating a display name a display name for a communication participant according to an embodiment of the present invention.

Other rules for disambiguating an ambiguous sender display name can also be implemented. FIG. 8 shows a flow diagram of a process 800 for generating a display name for a message sender (or other participant) according to an embodiment of the present invention. Process 800 can be implemented, e.g., in display name generator 234 of FIG. 2.

At block 802, process 800 can determine a default display name for the sender. This portion of process 800 can be similar or identical to blocks 702-712 of process 700 described above, which result in determining a given name that can be used as a default display name. At block 820, process 800 can determine whether the default display name is unique within a defined set of relevant participants, similarly to block 720 of process 700. If the default display name is determined to be unique at block 820, then at block 822, the default display name can be used as the sender display name (e.g., used to populate a sender display name field), and process 800 can end.

If, at block 820, the default display name is determined to be not unique, then process 800 can apply various rules (also referred to as "disambiguation rules") at block 824 to generate alternative display names for the sender. A variety of disambiguation rules can be provided, and the disambiguation rules can be prioritized as desired. One example of a disambiguation rule can be the iterative addition of characters from a surname to a given name, e.g., as described above with reference to FIG. 7. However, this may not always suffice, or it may not be the most space-efficient option. Accordingly, other disambiguation rules can also be considered.

For example, candidates for an alternative display name can be constructed according to each of a number of different disambiguation rules. FIG. 9 shows table 900 providing examples of disambiguation rules that can be used according to various embodiments of the present invention. For each rule (in column 902), four examples of display names that can be generated are shown (columns 911, 912, 913, 914). For purposes of these examples, it is assumed that the set of relevant participants corresponds to contacts list 300 of FIG. 3. A display name in italics indicates that it is not unique within the set of relevant participants, and the notation <null> indicates that the rule cannot be applied due to missing information.

Rule 921 can generate a display name using just the sender's nickname (if available) or given name. For Example 1 (column 911), a unique name "JD" is generated. For Example 2 (column 912), the display name "Karen" is considered unique because only the entry in contacts list 300 that matches the email address "kmarx@here.com" has the given name Karen and, in this example, senders not on the user's contacts list are not considered as relevant participants. For Example 3 (column 913), the display name "Sarah" is not unique because both Sarah Swann and Sarah Stallworth have the given name "Sarah." For Example 4 (column 914), the sender is not in the user's contacts list, but the username portion of the sender's email address can be treated as a given name (as described above). However, for Example 4, "karen" is not considered a unique identifier within the relevant set of senders because a record in contacts list 300 has the given name "Karen" associated with a different email address.

Rule 922 can generate a display name by using the sender's given name and adding characters of the surname as needed. This can be similar to process 700 described above, except that in this case, any nicknames are ignored. Thus, for Example 1, the unique display name would be "John D." For Example 2, "Karen" is again considered unique. For Example 4, in this case the domain name can be substituted for a surname as a source of characters as described above, and the "@" symbol can be used to indicate that the additional characters are from a domain name rather than an actual surname.

Rule 923 can be similar to Rule 922, except that nicknames are used where available; thus Example 1 has a different result, while the result is the same for users with no nickname.

Rule 924 can generate a display name by using the sender's surname and adding characters of the given name as needed. For Examples 1 and 3, the surname is unique. For Example 2, the surname "Marx" is not unique, but the surname plus the initial of the given name ("K. Marx") is unique. For Example 4, a <null> result indicates that a surname of this sender is not known.

Rule 925 can be similar to rule 924, except that an initial of the sender's given name is always used, even if the surname is unique. Additional characters of the sender's given name can be added as needed to produce a unique result.

Rule 926 can generate a display name by using the sender's nickname or given name and adding a portion of the sender's domain name if needed to disambiguate. In this example, domain name information is placed in parenthesis; other formatting can be substituted. Domain name information is not needed to disambiguate in Examples 1 and 2. For Example 3, "isp1" suffices to disambiguate between the two Sarahs in contacts list 300, and for Example 4, "domain" disambiguates over the one Karen in contacts list 300. In these examples, the domain name can be parsed into sections (e.g., recognizing the dot as a separator character), and sections of the domain name can be added as needed. Alternatively, the domain name can be added one character at a time (e.g., as described above for the case of using a domain name in place of a surname); however, this may provide less information to the client user.

Rule 927 can generate a display name by using the sender's nickname or given name plus the company name for the sender, as determined from contacts list 300. In this example, the company name is added regardless of whether it is needed to disambiguate, but in other embodiments, the company name can be omitted if it is not needed to disambiguate. For Example 3, neither Sarah in contacts list 300 has a company name associated with the entry, and the result is therefore not a unique display name. For Example 4, a question mark is used to indicate that the sender is not in contacts list 300.

Rule 928 can generate a display name by using the sender's nickname or given name plus the city name associated with the sender, as determined from contacts list 300. In this example, the city name is added regardless of whether it is needed to disambiguate, but in other embodiments, the city name can be omitted if it is not needed to disambiguate. For Example 3, both Sarahs in contacts list 300 have the same city name associated with the entry, and the result is therefore not a unique display name. For Example 4, a question mark is used to indicate that the sender is not in contacts list 300.

Rules 921-928 are provided for purposes of illustration, and any or all of these rules, or other rules, can be used.

Referring again to FIG. 8, applying various disambiguation rules at block 824 can produce one or more candidate display names that are unique over the set of relevant participants. At block 826, one of the candidate display names can be selected as an alternative display name. For example, if only one of the disambiguation rules produced a unique display name, then that display name can be selected. If two or more rules produced unique display names, then a selection preference can be used to select among them. For example, the selection preference can be in favor of the shortest (i.e., fewest characters) unique display name. Or the selection preference can be based on a ranking among the rules, such as preferring given name or nickname (rule 921), then given name or nickname plus characters of surname (rule 923), then given name plus domain name (rule 926), then given initial(s) plus surname (rule 925), in that order. (Other rankings can be defined.) The selected display name can be used to populate a display name field of the inbound message (e.g., similarly to FIGS. 6A and 6B above).

In some instances, it is possible that none of the disambiguation rules produces a unique display name. In that case process 800 can incorporate a default behavior (e.g., just use the sender's given name).

At block 828, the selected candidate display name can be used as the sender display name (e.g., used to populate a sender display name field).

It will be appreciated that process 800 is illustrative and that variations and modifications are possible. Steps described as sequential may be executed in parallel, order of steps may be varied, and steps may be modified, combined, added or omitted. Different disambiguation rules and combinations of rules can be defined. Process 800 or process 700 can be applied to any participant in a communication exchange, not limited to the sender of a particular message.

While the invention has been described with respect to specific embodiments, one skilled in the art will recognize that numerous modifications are possible. For example, while various processes for adaptively generating display names are described above as being performed by a message management service, these processes can also be performed by other computer systems that receive inbound messages for a client user. For instance, a messaging service or a client device can perform display name generation.

The set of relevant participants can be defined as desired. Some embodiments described above define the set of relevant participants as including all records in a contacts list for the client user. In some embodiments, the set of relevant participants can be defined as the participants (senders and/or recipients of messages) in a particular communication exchange such as an email thread, and processes described above can be used to generate a unique identifier for each participant relative to other participants in the exchange, even if the identifier does not uniquely distinguish from all the client user's contacts. For instance, referring to FIG. 3, in an email message thread whose participants are the client user to whom contacts list 300 belongs, user "locke@companya.com," and user "jdoe@here.com," the display names can be "John" and "JD"; although the name "John" is not unique relative to all names in contacts list 300, it is unique within the context of the thread.

In some embodiments, an inbound message can include identifiers of multiple participants, such as the sender, the client user, and one or more other participants (e.g., as shown in FIG. 6A). If desired, processes 700 or 800, or similar processes, can be used to generate a display name for each participant. In some embodiments, the client user can be identified using a personal pronoun, such as "Me," and this identifier can be either expressly added during inbound message processing or inferred by the message management client app.

In some embodiments, an inbound message can be addressed to multiple recipients who are client users of message management service 200. Where this is the case, the message can be processed to generate display names separately for each client user, and different display names can be generated for each client user. Thus, each client user can receive display names that are both short (where feasible) and helpful to him or her in recognizing or distinguishing among senders.

Figure 10:
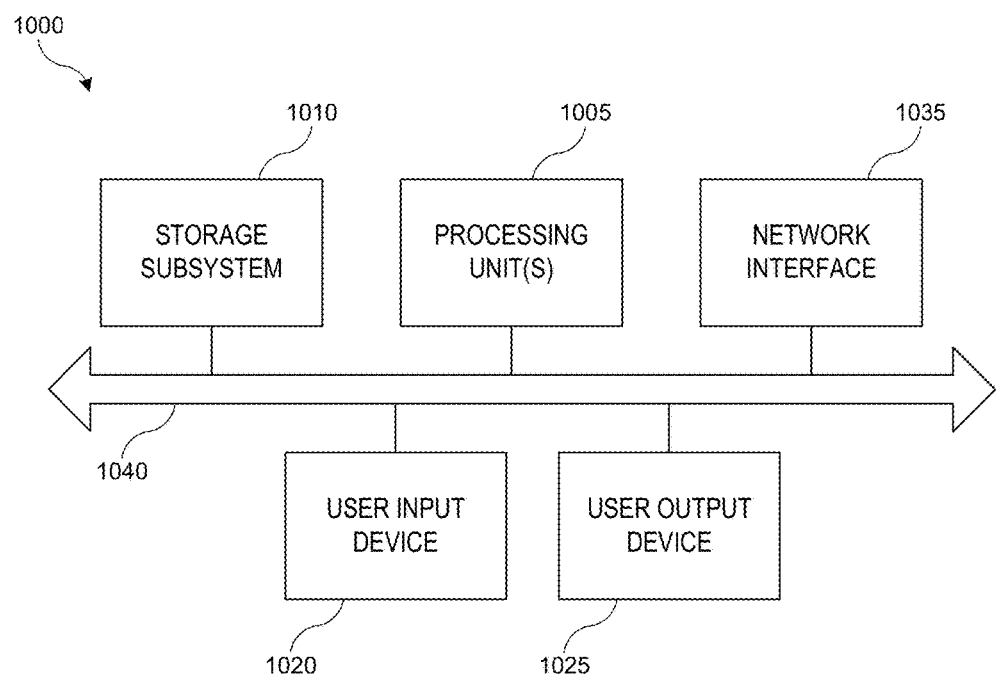
FIG. 10 shows a simplified block diagram of a representative computer system that can be used in an embodiment of the present invention.

Various operations described herein can be implemented on computer systems, which can include systems of generally conventional design. FIG. 10 shows a simplified block diagram of a representative computer system 1000. In various embodiments, computer system 1000 or similar systems can implement a client device (e.g., any of client devices 108, 110, 202 described above) or a server system (e.g., all or part of message management service 200 described above). Computer system 1000 can include processing unit(s) 1005, storage subsystem 1010, input devices 1020, output devices 1025, network interface 1035, and bus 1040.

Processing unit(s) 1005 can include a single processor, which can have one or more cores, or multiple processors. In some embodiments, processing unit(s) 1005 can include a general-purpose primary processor as well as one or more special-purpose co-processors such as graphics processors, digital signal processors, or the like. In some embodiments, some or all processing units 1005 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1005 can execute instructions stored in storage subsystem 1010.

Storage subsystem 1010 can include various memory units such as a system memory, a read-only memory (ROM), and a permanent storage device. The ROM can store static data and instructions that are needed by processing unit(s) 1005 and other modules of computer system 1000. The permanent storage device can be a read-and-write memory device. This permanent storage device can be a non-volatile memory unit that stores instructions and data even when computer system 1000 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that processing unit(s) 1005 need at runtime.

Storage subsystem 1010 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 1010 can include removable storage media that can be readable and/or writeable; examples of such media include compact disc (CD), read-only digital versatile disc (e.g., DVD-ROM, dual-layer DVD-ROM), read-only and recordable Blu-Ray® disks, ultra density optical disks, flash memory cards (e.g., SD cards, mini-SD cards, micro-SD cards, etc.), magnetic disks, and so on. The computer readable storage media do not include carrier waves and transitory electronic signals passing wirelessly or over wired connections.

In some embodiments, storage subsystem 1010 can store one or more software programs to be executed by processing unit(s) 1005, such as an operating system, various applications, and so on. "Software" refers generally to sequences of instructions that, when executed by processing unit(s) 1005, cause computer system 1000 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 1005. Software can be implemented as a single program or a collection of separate programs or program modules that interact as desired. From storage subsystem 1010, processing unit(s) 1005 can retrieve program instructions to execute and data to process in order to execute various operations described herein.

A user interface can be provided by one or more user input devices 1020 and one or more user output devices 1025. Input devices 1020 can include any device via which a user can provide signals to computer system 1000; computer system 1000 can interpret the signals as indicative of particular user requests or information. In various embodiments, input devices 1020 can include any or all of a keyboard, track pad, touch screen, mouse or other pointing device, scroll wheel, click wheel, dial, button, switch, keypad, microphone, and so on.

User output devices 1025 can include any device via which computer system 1000 can provide information to a user. For example, user output devices 1025 can include a display to display images generated by computer system 1000. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touch screen that function as both input and output device. In some embodiments, other user output devices 1025 can be provided in addition to or instead of a display. Examples include indicator lights, speakers, tactile "display" devices, printers, and so on.

In some embodiments, input device 1020 and output devices 1025 can interoperate to provide a graphical user interface ("GUI") that allows a user to interact with computer system 1000 by using an input device to select a control element displayed on the screen (e.g., by operating a pointing device such as a mouse or touching the location where a control element is displayed on a touch screen).

Network interface 1035 can provide voice and/or data communication capability for computer system 1000, including the ability to communicate with various messaging services and/or message management services to access and act upon messages. In some embodiments, network interface 1035 can include radio frequency (RF) transceiver components for accessing wireless voice and/or data networks (e.g., using cellular telephone technology; advanced data network technology such as 3G, 4G, or LTE, IEEE 802.11 family standards (e.g., Wi-Fi® standards promulgated by the Wi-Fi Alliance); Bluetooth® standards (promulgated by Bluetooth SIG); or other mobile communication technologies, or any combination thereof), GPS receiver components, and/or other components. In some embodiments, network interface 1035 can provide wired network connectivity (e.g., Ethernet) in addition to or instead of a wireless interface. Network interface 1035 can be implemented using a combination of hardware (e.g., antennas, modulators/demodulators, encoders/decoders, and other analog and/or digital signal processing circuits) and software components.

Bus 1040 can include various system, peripheral, and chipset buses that communicatively connect the numerous components of computer system 1000. For example, bus 1040 can communicatively couple processing unit(s) 1005 with storage subsystem 1010. Bus 1040 can also connect to input devices 1020 and output devices 1025. Bus 1040 can also couple computing system 1000 to a network through network interface 1035. In this manner, computer system 1000 can be a part of a network of multiple computer systems (e.g., a local area network (LAN), a wide area network (WAN), an intranet, or a network of networks, such as the Internet.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 1005 can provide various functionality for computer system 1000. For example, computer system 1000 can execute any and all of the display name generation processes described above.

It will be appreciated that computer system 1000 is illustrative and that variations and modifications are possible. Computer system 1000 can have other capabilities not specifically described here (e.g., mobile phone, global positioning system (GPS), power management, one or more cameras, various connection ports for connecting external devices or accessories, etc.). Further, while computer system 1000 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
   receiving, at a management server, a first message to a first conversation among a first set of relevant participants, from an electronic messaging service, to be delivered to a client device of a client user, the message including identifying information of a sender;
   receiving, at the management server, a second message to a second conversation among a second set of relevant participants, from the electronic messaging service, to be delivered to the client device of the client user, the message including the identifying information of the sender, wherein the second conversation and the first conversation are at least partially contemporaneous;
   generating, by the management server, a first graphical user interface (GUI) comprising the first message and a first default display name of the sender for the first conversation, based at least in part on the identifying information of the sender, by:
      extracting the identifying information of the sender;
      generating a first initial default display name for the sender, based on the extracted identifying information of the sender;
      determining that the first initial default display name does not uniquely identify the sender within the first set of relevant participants to the first conversation;
      generating one or more first candidate alternative display names based on corresponding one or more rules by appending one or more additional characters to the first initial default display name that uniquely identifies the sender within the first set of relevant participants to the first conversation;
      identifying first candidate alternative display name that is a shortest among the one or more first candidate alternative display names;
      assigning, as the first default display name, the shortest first candidate alternative display name; and
      populating the first default display name in a first sender display name field of the first message on the first GUI; and
   generating, by the management server, a second GUI comprising the second message and a second default display name of the sender for the second conversation, based at least in part on the identifying information of the sender, by:
      generating a second initial default display name for the sender, based on the extracted identifying information of the sender;
      determining that the second initial default display name uniquely identifies the sender within the second set of relevant participants to the second conversation;
      assigning, as the second default display name, the second initial default display name, wherein the second initial default display name does not uniquely identify the sender within the first set of relevant participants to the first conversation; and
      populating the second default display name in a second sender display name field of the second message on the second GUI; and
   transmitting, by the management server, the first GUI comprising the first message and the first default display name field, and the second GUI comprising the second message and the second default display name, to the client device of the client user.

2. The method of claim 1, wherein the first default display name corresponds to a given name of the participant and wherein generating the first candidate alternative display name includes adding a number of initial characters of a surname of the participant to the first initial default display name, wherein the number of initial characters is a minimum number such that the first candidate alternative display name uniquely identifies the sender within the first set of relevant participants.

3. The method of claim 1, wherein the first default display name corresponds to a username extracted from the identifying information of the sender and wherein generating the first candidate alternative display name includes adding at least a portion of a domain name extracted from the identifying information of the sender to the first initial default display name.

4. The method of claim 1, wherein generating the first candidate alternative display name includes augmenting the first initial default display name with an additional item of information pertaining to the sender.

5. The method of claim 4, wherein the additional item of information includes one or more of:
   a domain name associated with the identifying information of the sender;
   a company name associated with the identifying information of the sender; or
   a geographical location associated with the identifying information of the sender.

6. The method of claim 1, wherein generating the first candidate alternative display name includes:
   applying a plurality of disambiguation rules to generate the one or more first candidate alternative display names; and
   selecting the first default display name from among the one or more first candidate alternative display names based on a ranking among the plurality of disambiguation rules.

7. The method of claim 1, wherein at least one of the first and second sets of relevant participants includes a set of all contacts in a contacts list of the client user.

8. The method of claim 1, wherein at least one of the first and second sets of relevant participants includes a set of all participants in an electronic communication exchange of which the message is a part.

9. A non-transitory computer-readable storage medium having stored thereon program code instructions that, when executed by a processor of a computer system, cause the computer system to execute a method comprising:
   receiving a first message to a first conversation among a first set of relevant participants, from an electronic messaging service, to be delivered to a client device of a client user, the message including identifying information of a sender of the first message;
   receiving a second message to a second conversation among a second set of relevant participants, from the electronic messaging service, to be delivered to the client device of the client user, the second message including the identifying information of the sender;
   generating a first graphical user interface (GUI) comprising the first message and a first default display name of the sender for the first conversation based at least in part on the identifying information of the sender, by:

extracting the identifying information of the sender from the message;
generating a first initial default display name for the sender based on the extracted identifying information of the sender;
determining that the first initial default display name does not uniquely identify the sender within the first set of relevant participants to the first conversation;
generating one or more first candidate alternative display names based on corresponding one or more rules by appending one or more additional characters to the first initial default display name that uniquely identifies the sender within the first set of relevant participants to the first conversation;
identifying the first candidate alternative display name that is a shortest among the one or more first candidate alternative display names; and
assigning, as the default display name, the shortest candidate alternative display name; and
populating the first default display name in a first sender display name field of the first message on the first GUI;

generating a second GUI comprising the second message and a second default display name of the sender for the second conversation, based at least in part on the identifying information of the sender, by:
generating a second initial default display name for the sender, based on the extracted identifying information of the sender;
determining that the second initial default display name uniquely identifies the sender within the second set of relevant participants to the second conversation; and
assigning, as the second default display name, the second initial default display name, wherein the second default display name does not uniquely identify the sender within the first set of relevant participants to the first conversation; and
populating the second default display name in a second sender display name field of the second GUI comprising the second message; and transmitting the first GUI comprising the first message and the first default display name field, and the second GUI comprising the second message and the second default display name, to the client device of the client user.

10. The computer-readable storage medium of claim 9, wherein generating the first candidate alternative display name includes:
applying a plurality of disambiguation rules to generate the one or more first candidate display names;
selecting the first default display name from among the one or more first candidate alternative display names based on a ranking among the plurality of disambiguation rules.

11. The computer-readable storage medium of claim 10, wherein the disambiguation rules include:
a first rule to generate a single first candidate alternative display name by adding a first number of initial characters of a surname of the sender to a given name of the sender, wherein the first number of initial characters is a minimum number such that the single first candidate alternative display name uniquely identifies the sender within the first set of relevant participants; and
a second rule to generate a further first candidate alternative display name by adding a second number of initial characters of a given name of the sender to a surname of the sender, wherein the second number of initial characters is a minimum number such that the further first candidate alternative display name uniquely identifies the sender within the first set of relevant participants.

12. The computer-readable storage medium of claim 10, wherein the disambiguation rules include a rule to generate the one or more first candidate alternative display names by augmenting the first initial display name with an additional item of information pertaining to the sender.

13. The computer-readable storage medium of claim 12, wherein the additional item of information includes at least one of:
a character of a given name associated with the sender identifier;
a character of a surname associated with the sender identifier;
a portion of a domain name associated with the sender identifier;
a company name associated with the sender identifier; or
a geographical location associated with the sender identifier.

14. The computer-readable storage medium of claim 9, wherein identifying the first candidate alternative display name includes selecting, from among the one or more first candidate alternative display names generated using the disambiguation rules, the shortest first candidate alternative display name that uniquely identifies the sender within the first set of relevant participants.

15. A computer system comprising:
a communication interface to receive a first inbound message to a first conversation, among a first set of relevant participants, from an electronic messaging service to be delivered to a client device of a client user, the first inbound message including a participant identifier of a sender of the first inbound message;
the communication interface to receive a second inbound message to a second conversation, among a second set of relevant participants, from the electronic messaging service to be delivered to the client device, the second inbound message including the participant identifier of the sender of the second inbound message; and
a processor coupled to the communication interface; and
a memory having instructions stored thereon, which, when executed by the processor, performs an operation comprising to:
generating, by the management server, a first graphical user interface (GUI) comprising the first message and a first default display name of the sender for the first conversation, based at least in part on the identifying information of the sender, by:
extracting the identifying information of the sender;
generating a first initial default display name for the sender, based on the extracted identifying information of the sender;
determining that the first initial default display name does not uniquely identify the sender within the first set of relevant participants to the first conversation;
generating one or more first candidate alternative display names based on corresponding one or more rules by appending one or more additional characters to the first initial default display name that uniquely identifies the sender within the first set of relevant participants to the first conversation;
identifying first candidate alternative display name that is a shortest among the one or more first candidate alternative display names;

assigning, as the first default display name, the shortest first candidate alternative display name; and populating the first default display name in a first sender display name field of the first message on the first GUI;

generating, by the management server, a second GUI comprising the second message and a second default display name of the sender for the second conversation, based at least in part on the identifying information of the sender, by:

generating a second initial default display name for the sender, based on the extracted identifying information of the sender;

determining that the second initial default display name uniquely identifies the sender within the second set of relevant participants to the second conversation;

assigning, as the second default display name, the second initial default display name, wherein the second initial default display name does not uniquely identify the sender within the first set of relevant participants to the first conversation; and populating the second default display name in a second sender display name field of the second message on the second GUI; and transmitting, by the management server, the first GUI comprising the first message and the first default display name field, and the second GUI comprising the second message and the second default display name, to the client device of the client user.

16. The computer system of claim 15, further comprising:

a second communication interface to deliver the second inbound message, including the populated participant second display name field, to a client device of the client user.

17. The computer system of claim 15, further comprising:

a user interface, wherein the processor is further configured to present, at the user interface, a representation of the first inbound message that includes the first default display name.

18. The computer system of claim 15, wherein the processor is further configured such that determining the second default display name includes:

generating a second initial default display name based at least in part on the participant identifier;

determining that the second initial default display name does not uniquely identify the sender within the second set of relevant participants;

generating a second candidate alternative display name, wherein the second candidate alternative display name uniquely identifies the sender within the second set of relevant participants;

assigning, as the second default display name, the second candidate alternative display name; and populating the second sender display name field of the second message with the second default display name.

19. The computer system of claim 18, wherein the processor is further configured such that generating the alternative display name includes:

applying a plurality of disambiguation rules to generate a plurality of second candidate alternative display names;

selecting the second candidate alternative display name from among the plurality of second candidate alternative display names based on a ranking among the plurality of disambiguation rules.

20. The computer system of claim 15, further comprising:

a storage medium to store a contacts list of the client user, wherein the processor is further configured to define the first and second sets of relevant participants based on the contacts list of the client user.

* * * * *